Aug. 23, 1966   W. W. BAILEY   3,268,270
VALVE DEVICES FOR CONTROLLING SERVO-DEVICES OF THE
DIFFERENTIAL AIR PRESSURE OR VACUUM TYPE
Filed May 22, 1964   4 Sheets-Sheet 4
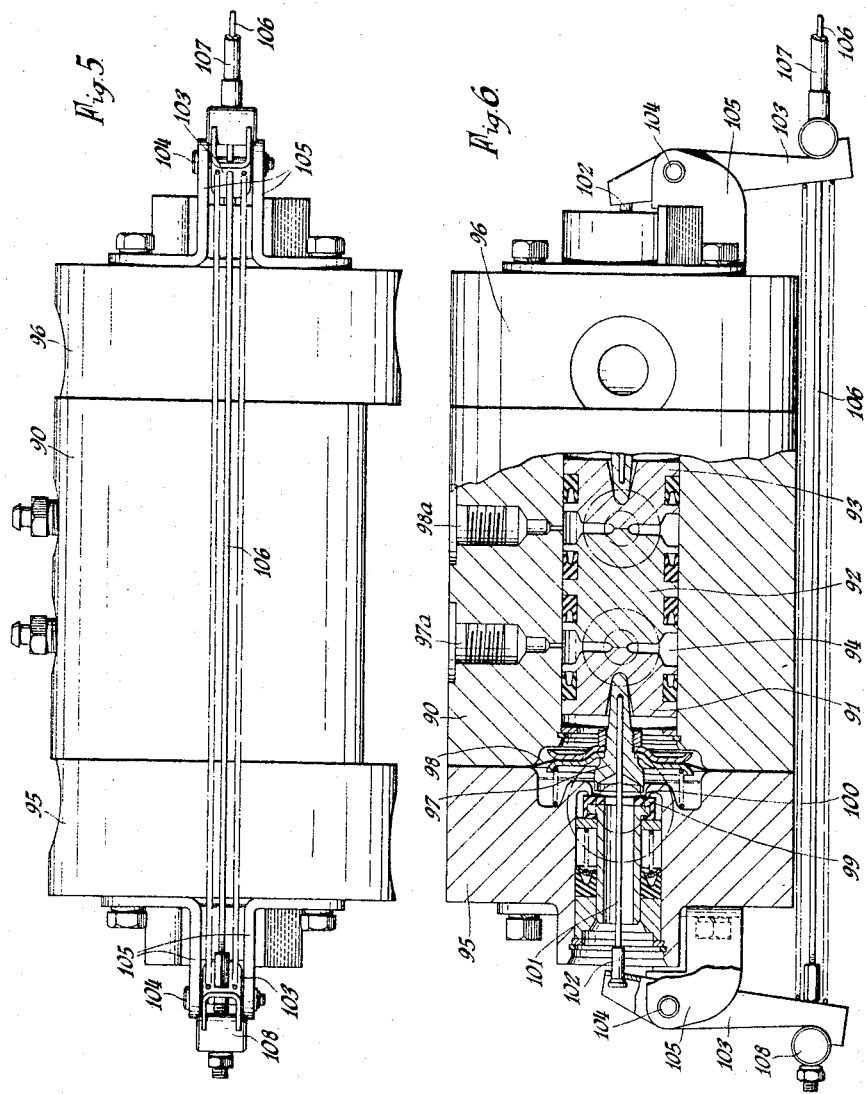
INVENTOR
Walter W. Bailey
BY Winter & Rockman
ATTORNEYS United States Patent Office 3,268,270
Patented August 23, 1966

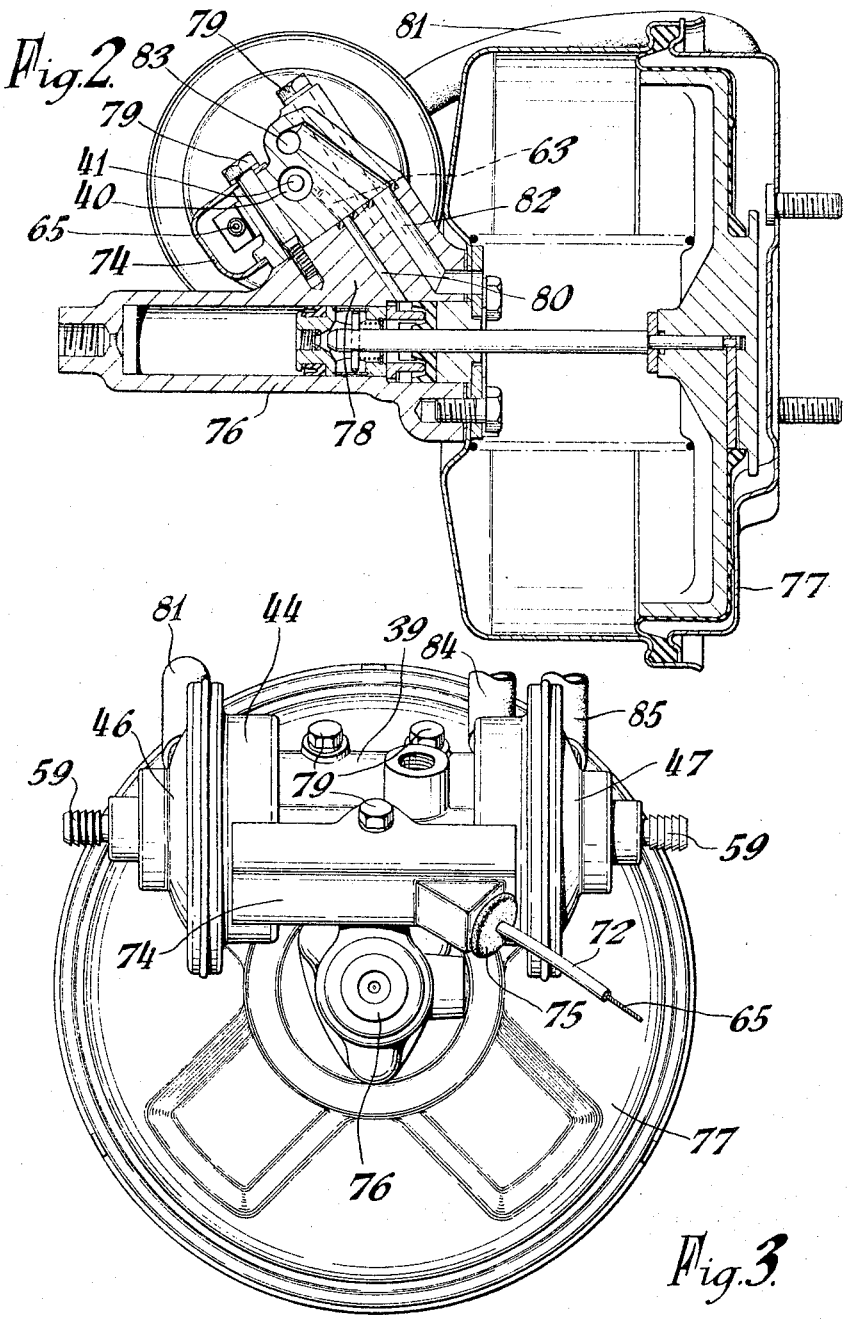

3,268,270
VALVE DEVICES FOR CONTROLLING SERVO-DEVICES OF THE DIFFERENTIAL AIR PRESSURE OR VACUUM TYPE
Walter W. Bailey, Leamington Spa, England, assignor to Automotive Products Company Limited, Leamington Spa, England
Filed May 22, 1964, Ser. No. 369,430
Claims priority, application Great Britain, May 23, 1963, 20,582/63
14 Claims. (Cl. 303—13)

This invention relates to valve devices for controlling the operation of servo-devices of the differential air pressure or vacuum type.

The invention has for its object to provide a valve device for controlling simultaneously the operation of two servo-devices of the above kind, the device incorporating two valves, one associated with each servo-device, the valves being operable simultaneously by fluid actuated means arranged so that equal thrust for operating the two valves is obtained at all times.

In a valve device according to the invention the valves are arranged one at either end of a cylinder having a through bore which contains two valve actuating pistons disposed one on either side of an intermediate or floating piston, both said actuating pistons being operable to actuate the valve associated therewith by the admission of pressure fluid to the cylinder between the floating piston and both said actuating pistons or between said floating piston and one of said actuating pistons.

Valves incorporating a diaphragm and referred to as reaction valves are commonly used for controlling the operation of servo-devices of the kind above referred to and particularly in fluid operated braking systems for vehicles. Accordingly the invention as applied to valves of this type will now be described by way of example with the aid of the accompanying drawings in which:

FIGURE 2 shows in section a servo-device incorporating the valve device of FIGURE 1.

FIGURE 3 is an end view of the servo-device as seen from the left of FIGURE 1.

FIGURES 5, 6 and 7 are views of a further modified form of the valve shown in FIGURE 1, FIGURE 6 being partly in section, FIGURE 5 being a top plan view of FIGURE 6 and FIGURE 7 an end view as seen from the left of FIGURE 5.

Figure 1:
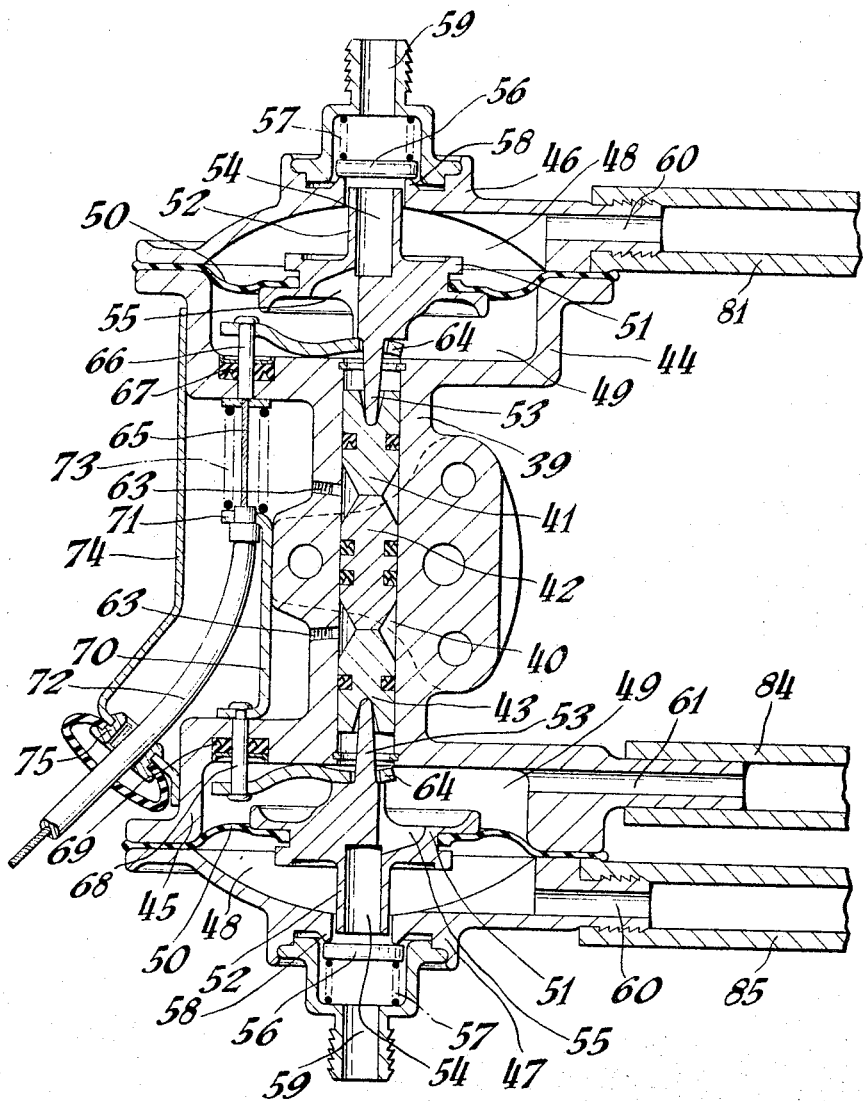
FIGURE 1 is a section through a valve according to the invention.

The valves shown in the drawings in addition to being fluid pressure operated are all adapted for operation mechanically so that in a fluid pressure braking system the valves can be operated mechanically for example in the event of a breakdown in the fluid pressure system preventing operataion of the valves by fluid pressure.

Referring to FIGURES 1, 2 and 3 of the accompanying drawings the valve comprises a cylinder body 39 having a through bore 40 containing three pistons 41, 42 and 43, the opposite ends of the cylinder body being formed to provide two cylindrical valve housings 44 and 45 respectively. The valve housing 44 is closed by an end cover 46 and the valve housing 45 is closed by an end cover 47, each valve housing being divided into chambers 48 and 49 by a diaphragm 50 each of which is clamped around its peripheral edge between the valve housing and end cover. Each diaphragm 50 is provided centrally with an aperture to receive a boss 51 the inner periphery of the diaphragm being sealed to the boss. Each boss has on one side a tubular spigot portion 52 extending into the chamber 48 and on the opposite side a solid spigot 53 which extends through the chamber 49 and into the bore 40 of the cylinder body 39 the inner end of each said solid spigot being in contact with the adjacent end of the appropriate piston 41 or 43. The chambers 48, 49 are open to one another through the passage 54 of each tubular spigot and apertures 55 in the boss. The outer end of each tubulaar spigot 54 faces a disc valve 56 each of which is spring loaded by a compression spring 57, the spring action maintaining each disc valve closed on a seating 58 in the end covers 46 and 47, each disc valve when seated closing an air inlet port 59 provided in each said end cover. The end covers 46 and 47 are each also provided with a port 60 each of which is adapted for connection to one side of the servo-device to be controlled by one of the valves each said port communicating with appropriate chamber 48. In addition the valve body 39 is formed adjacent one end to provide a port 61 adapted for connection to a source of vacuum. The port 61 opens directly into one of the chambers 49, the lower one in FIGURE 1. The valve body 39 is also provided with two further ports 63 provided by drillings through the wall of the body, each said port being adapted for connection to the pedal operated tandem master cylinder of a braking system, the ports being axially spaced from one another and positioned in the length of the valve body 39 so that pressure fluid can be supplied between the adjacent ends of the pistons 41, 42 and 43, such ends being conically formed as shown in FIGURE 1, to provide annular spaces at the piston ends for the admission of the pressure fluid into the bore 40. The arrangement is such that upon the admission of pressure fluid through the ports 63 the pistons 41, 43 move axially outwards in the bore 40 such movement causing displacement of the diaphragm 50 and bushes so that the outer end of each tubular spigot 52 engages the adjacent disc valve whereby the passages 54 are closed and the air inlet ports 59 opened by the unseating of the disc valves. Thus the servo-devices associated with the valves are both operated simultaneously, balanced actuation of the valves being obtained due to the provision of the intermediate or floating piston 42. In addition, should the pressure of the supply to either port 63 be reduced or fully interrupted both valves will still operate due to the pressure of the said intermediate or floating piston and the balanced effect will be retained. The valve unit shown in FIGURE 1 is adapted for mechanical operation. A radially extending lever 64 is provided in each chamber 49 each of which is curved intermediate its length to provide a fulcrum bearing against the inner end of the chamber and about which each said lever can pivot. The inner end of each lever 64 has a hole through which the solid spigots 53 extend so that the end of each lever bears against the inner side of the appropriate boss. To actuate the valves mechanically the levers 64 are adapted to be pivoted in opposite directions, the upper lever 64 turning in the anti-clockwise direction and the lower lever in the clockwise direction (FIGURE 1), by operation of a flexible cable connected to an operator control. The core 65 of the flexible cable is connected to the radially outer end of the upper lever 64 (FIGURE 1) the connecting nipple 66 passing out of the chamber 49 through a sealed joint shown generally at 67 the opposite end of the core being connected to the operator control. The radially outer end of the lever 64 in the lower chamber 49 (referring to FIGURE 1), is coupled by a pull rod 68, which passes out of the chamber through a sealed opening 69, to one end of a slide 70, the opposite end 71 of the slide providing an abutment against which one end of the casing 72 of the flexible cable bears, the opposite end being connected to an abutment on the operator control. A compression spring 73 acts on the slide 70 and serves to maintain the levers 64 in the rest position, a removable closure cover 74 enclosing the slide and spring, the flexible cable passing out of the casing through a grommet 75.

FIGURES 2 and 3 show the valve unit of FIGURE 1 mounted on a vacuum servo-operated master cylinder providing one of a pair of such devices incorporated in a fluid pressure operated braking system, one of the master cylinders being connected to the brake circuit of the front wheels of a vehicle the other being connected to the brake circuit of the rear wheels. The master cylinder shown generally at 76 and servo-devices shown generally at 77 are of conventional construction and operation and accordingly do not require detailed description. The valve unit of FIGURE 1 is mounted on a mounting pad 78 on one of the master cylinders and secured by bolts 79 passages 80 in the pad registering with the ports 63 (shown displaced in FIGURE 1) for the supply of fluid to operate the pistons 41, 43 the inlet of each master cylinder being connectable one to each of the outlets of a pedal operated tandem master cylinder. The upper valve of the unit shown in FIGURE 1 controls the operation of the servo-device of the master cylinder on which the valve unit is mounted and accordingly the port 60 of the valve end cover is connectable by a flexible pipe 81 to one side of this servo-device, the other side of the servo-device being connected through a passage 82 in the mounting pad and an axial passage 83 in the valve body 39 to the chamber 49 of the upper valve (FIGURE 1). The lower valve (FIGURE 1) controls operation of the other servo-device of the pair of servo-devices and accordingly the ports 61 and 60 are connected by flexible pipes 84 and 85 respectively to the appropriate connections on the servo-device.

Figure 7:
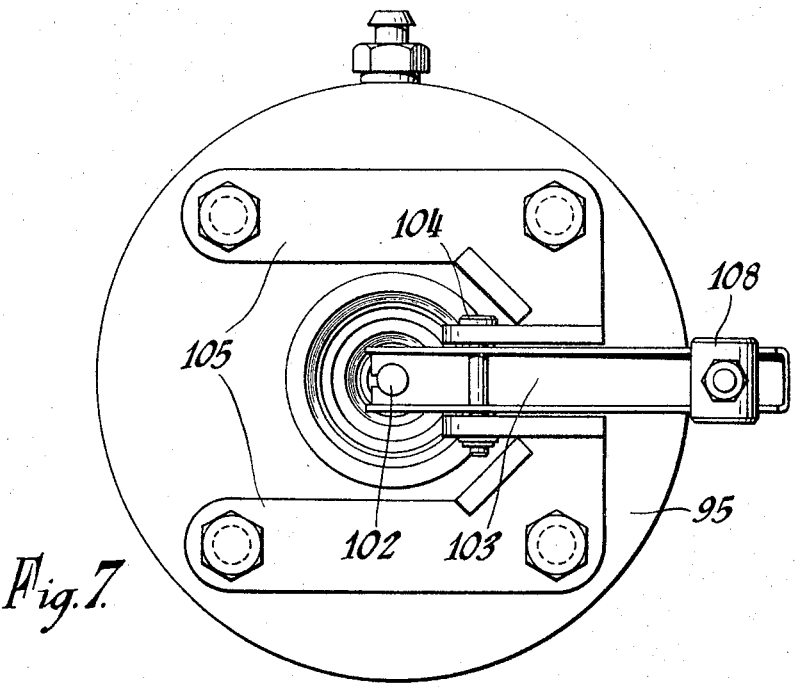

FIGURES 5, 6 and 7 of the drawings show a modified form of valve unit adapted particularly for controlling operation of an air servo-device. The unit comprises a valve body 90 having three pistons 91, 92, 93 arranged as in FIGURE 1, end to end in the bore 94 of the valve body. Valve housings 95, 96 each secured to opposite ends of the valve body contain identical valves as shown at the left end of FIGURE 6. Hydraulic liquid or other fluid admitted to the bore 94 through one or the other or both inlets 97a, 98a in the valve body results in outward opposite movement of both pistons 91, 93 such outward movement causing corresponding movement of a valve operating spigot 97 each of which is carried by and disposed centrally of a flexible diaphragm 98 each of which is clamped around its peripheral edge portion between the appropriate valve housing and adjacent end of the valve body. The movement imparted to each valve operating spigot 97 causes the outer end of the same to engage an associated annular closure member 99 to unseat the same from a seating 100, the closure member being spring loaded so as normally to be held seated.

For obtaining joint mechanical operation of the valves in the valve housings each valve operating spigot 97 is swaged to one end of a short length of flexible cable 101 the opposite end of which extends out of the outer end of the appropriate valve housing. The outer end of each flexible cable 101 has a nipple 102 which engages in the adjacent forked end of a lever 103 each of which is pivotally mounted at a point in its length on a pivot pin 104 carried by a bracket 105 bolted to the outer end of each valve housing. Mechanical operation of the valves is obtained by effecting pivotal movement of the levers 103, the lever at the left of FIGURE 6 being turned in an anticlockwise direction and the lever 103 at the right in a clockwise direction. The turning movements are effected by actuation of an operator control, not shown, which is operatively connected to the levers 103 by a Bowden or other flexible cable having a core wire 106 and a casing 107. One end of the core wire 106 is coupled through an adjuster 108 to the outer end of the lever 103 at the left of FIGURE 6 the opposite end of the core wire being connected to the operator control. One end of the casing 107 abuts the outer end of the lever 103 to the right of FIGURE 6, the other end of the casing bearing against a fixed abutment on or in the region of the operator control. The arrangement is such that upon actuation of the operator control to apply a pull to the core wire 106 the lever 103 will turn in the anti-clockwise direction the reaction through the casing of the cable causing the clockwise turning of the lever 103 to the right of FIGURE 6 whereby both valve operating spigots are actuated to unseat the associated closure member.

Figure 4:
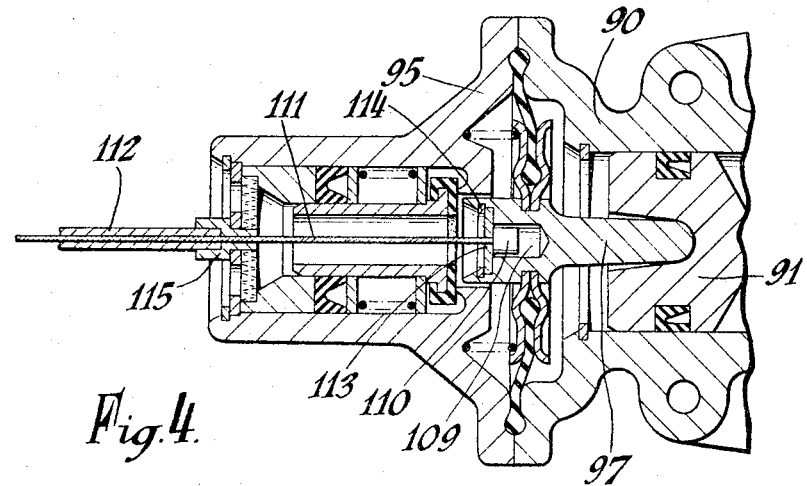
FIGURE 4 is a fragmentary view showing a modification of the valve of FIGURE 1.

FIGURE 4 shows in section, one end of a valve unit of similar construction to that disclosed in FIGURES 5, 6 and 7 the means for effecting the mechanical actuation being however modified. In this particular arrangement each operating spigot 97 is provided with a recess 109 to receive a bead 110 swaged onto the end of the wire core 111 of a Bowden or other flexible cable having a casing 112. The bead 110 bears against a disc 113 secured in the recess 109 by a retaining ring 114. The wire core extends out of the outer end of the valve housing, the opposite end of the core being attached to the operator control not shown, the cable casing having one end abutting a nipple 115 supported in the end of the valve housing the opposite end of the casing bearing against an abutment on or in the region of the operator control.

Whilst any suitable form of operator control can be provided to effect the mechanical actuation of the valve, a valve according to the present invention adapted for mechanical operation as disclosed above is particularly suitable for incorporation in a vehicle braking system as disclosed in the copending U.S. application, Serial No. 277,645, filed May 2, 1963, the operator control disclosed therein being associated with the vehicle hand brake lever so as to be jointly operable therewith whereby power assistance can be provided for actuating the wheel brakes mechanically operable by the hand brake.

I claim:

1. A valve device for controlling the operation of servo-devices of the differential air pressure or vacuum type wherein valve are arranged one at either end of a valve body having a through bore which contains two valve actuating pistons disposed one on either side of an intermediate or floating piston, both said actuating pistons being operable to actuate the valve associated therewith by the admission of pressure fluid to the valve body bore between the floating piston and both said actuating pistons or between said floating piston and one of said actuating pistons.

2. A valve device according to claim 1 wherein an operating member is provided between each valve actuating piston and the associated valve.

3. A valve device according to claim 2 wherein each operating member is mounted so as to be movable in the lengthwise direction thereof, each such operating member extending between the valve actuating piston and a closure member of the valve, movement of the pistons by fluid pressure resulting in movement of each operating member and the associated closure member.

4. A valve device according to claim 2 wherein each valve is a reaction valve incorporating a diaphragm.

5. A valve device according to claim 3 wherein each operating member is carried by the valve diaphragm.

6. A valve device according to claim 5 including means for mechanically operating the valves.

7. A valve device according to claim 6 wherein both valves are operable simultaneously by said mechanical operating means.

8. A valve device according to claim 6 wherein the mechanical means comprises a flexible cable operatively associated with the valves and an operator control.

9. A valve device according to claim 8 wherein one of said valves is operable by a wire core of the cable, the other valve being operable by reaction through a cable casing surrounding the core.

10. A valve device for controlling the operation of servo-devices of the differential pressure type comprising a valve body with a bore therein, a pair of valve actuating pistons disposed in said bore, at opposite ends thereof, a floating piston disposed in said bore between said actuating pistons, valve means operatively connected to each valve actuating piston for actuation by one of said actuating valve pistons, and means for admitting pressure fluid to said bore between each of said pair of actuating pistons and said floating piston.

11. The device of claim 10 wherein said pressure fluid admitting means includes spaced passages disposed in said valve body.

12. The device of claim 11 wherein operating means are provided for said valve means comprising an operating member disposed between each valve actuating piston adjacent its outer end, and one of said valve means, with each valve means being disposed adjacent the opposite ends of said valve body.

13. The device of claim 12 wherein each operating member is disposed for movement in a lengthwise direction in said valve body.

14. The device of claim 13 wherein each operating member includes mechanical means for operating the valve means.

References Cited by the Examiner
FOREIGN PATENTS 137,344 10/1947 Australia.
1,206,847 8/1959 France.

BENJAMIN HERSH, *Primary Examiner.*

EUGENE G. BOTZ, *Examiner.*

M. S. SALES, *Assistant Examiner.*